(12) United States Patent
Gilbert et al.

(10) Patent No.: US 10,719,148 B2
(45) Date of Patent: Jul. 21, 2020

(54) COUPLING A PEN DEVICE TO A COMPANION DEVICE BASED ON PEN PROXIMITY

(71) Applicant: Microsoft Technology Licensing, LLC, Redmond, WA (US)

(72) Inventors: Jay Gilbert, Redmond, WA (US); Frank Gorgenyi, Bremerton, WA (US); Arie Yehuda Gur, Kiryat Ono (IL); Maxim Kudryavtsev, Redmond, WA (US); Alain L. Michaud, Boischatel (CA); Rahul Ramadas, Bellevue, WA (US); Uri Ron, Herzliya (IL); Daryl M. Wilson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/181,308

(22) Filed: Nov. 5, 2018

(65) Prior Publication Data

US 2020/0019255 A1 Jan. 16, 2020

Related U.S. Application Data

(60) Provisional application No. 62/696,331, filed on Jul. 10, 2018.

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *H04W 4/80* (2018.02);
(Continued)

(58) Field of Classification Search
CPC ....................... H04W 12/04–12/04071; H04W 12/06–12/0609; H04W 4/80;
(Continued)

(56) References Cited

U.S. PATENT DOCUMENTS 6,282,407 B1 8/2001 Vega et al.
7,174,130 B2 2/2007 Kurisko et al.
(Continued)

FOREIGN PATENT DOCUMENTS

| EP | 2428874 A1 | 3/2012 | |
|---|---|---|---|
| WO | 2014133312 A1 | 9/2014 | |
| WO | WO-2014133312 A1 * | 9/2014 | ......... G06F 3/03545 |

OTHER PUBLICATIONS

"International Search Report and Written Opinion Issued in PCT Application No. PCT/US19/037841", dated Sep. 17, 2019, 12 Pages.

(Continued)

*Primary Examiner* — Laurence J Lee

(57) ABSTRACT

The disclosure herein describes coupling a stylus and a computing device. Based on a tip of a stylus being brought proximate to a display of a computing device configured to communicate in accordance with a wireless protocol, the computing device is configured to receive a stylus wireless protocol identifier and transmit a wireless protocol identifier of the computing device and one or more security keys to the stylus via a communication channel in response, whereby the stylus and computing device are coupled. Based on receiving a signal associated with user input from the coupled stylus using the wireless protocol, the computing device performs an operation based on the signal. The described "loose coupling" enables streamlined use of styluses with compatible computing devices without requiring full pairing.

20 Claims, 11 Drawing Sheets

(51) Int. Cl.
    *H04W 4/80*      (2018.01)
    *H04W 76/11*     (2018.01)
    *H04W 12/04*     (2009.01)
    *H04W 12/06*     (2009.01)
    *H04W 8/00*      (2009.01)

(52) U.S. Cl.
    CPC ........... *H04W 8/005* (2013.01); *H04W 12/04* (2013.01); *H04W 12/06* (2013.01); *H04W 76/11* (2018.02); *G06F 2203/0384* (2013.01)

(58) Field of Classification Search
    CPC ... H04W 76/10; H04W 76/11; G06F 3/03545; G06F 2203/0384; G06F 3/0383
    See application file for complete search history.

(56) References Cited

U.S. PATENT DOCUMENTS

| | | | |
|---|---|---|---|
| 7,551,593 | B2 | 6/2009 | Haller et al. |
| 7,907,901 | B1 | 3/2011 | Kahn et al. |
| 8,213,613 | B2 | 7/2012 | Diehl et al. |
| 8,442,549 | B2 | 5/2013 | Niranjan et al. |
| 8,666,313 | B2 | 3/2014 | Preston et al. |
| 8,928,635 | B2 | 1/2015 | Harley et al. |
| 9,164,599 | B2 | 10/2015 | Dowd et al. |
| 9,699,653 | B2 | 7/2017 | MacDuff et al. |
| 9,762,316 | B2 | 9/2017 | Kukulski et al. |
| 9,924,019 | B2 | 3/2018 | Jeganathan et al. |
| 2007/0038538 | A1* | 2/2007 | Silverbrook ........ G06F 3/03545 705/35 |
| 2008/0057868 | A1 | 3/2008 | Chang |
| 2008/0150917 | A1 | 6/2008 | Libbey et al. |
| 2011/0028091 | A1 | 2/2011 | Higgins et al. |
| 2011/0081860 | A1 | 4/2011 | Brown et al. |
| 2013/0106722 | A1 | 5/2013 | Shahpamia et al. |
| 2013/0189924 | A1 | 7/2013 | Pedro et al. |
| 2013/0203353 | A1 | 8/2013 | Kim et al. |
| 2014/0043245 | A1 | 2/2014 | Dowd et al. |
| 2014/0123214 | A1 | 5/2014 | Black et al. |
| 2014/0125575 | A1 | 5/2014 | Samanta Singhar |
| 2014/0157135 | A1 | 6/2014 | Lee et al. |
| 2014/0176495 | A1 | 6/2014 | Vlasov |
| 2014/0253467 | A1 | 9/2014 | Hicks et al. |
| 2014/0256250 | A1 | 9/2014 | Cueto et al. |
| 2014/0340328 | A1 | 11/2014 | Kameyama et al. |
| 2015/0050879 | A1 | 2/2015 | Macduff et al. |
| 2015/0277587 | A1 | 10/2015 | Chandran et al. |
| 2015/0331501 | A1 | 11/2015 | Nicholson et al. |
| 2016/0337496 | A1 | 11/2016 | Jeganathan et al. |
| 2017/0078300 | A1 | 3/2017 | He et al. |
| 2017/0153763 | A1* | 6/2017 | Vavra .................... G06F 3/0488 |
| 2017/0289744 | A1 | 10/2017 | Li |
| 2018/0176358 | A1 | 6/2018 | Jeganathan et al. |

OTHER PUBLICATIONS

"Definition of electrostatic", Retrieved from: https://en.oxforddictionaries.com/definition/electrostatic, Retrieved Date: Jun. 20, 2018, 1 Page.

"Definition of electrostatic generator", Retrieved from: https://en.oxforddictionaries.com/definition/us/electrostatic_generator, Retrieved Date: Jun. 20, 2018, 3 Pages.

"Electrostatic Discharge", Retrieved from: https://ieeexplore.ieee.org/document/585094/definitions?anchor=definitions, Retrieved From: Jun. 20, 2018, 2 Pages.

"Jot Touch 4 Support", Retrieved from: http://www.adonit.net/support/jot-touch-4/>, Mar. 26, 2013, 5 Pages.

"Pencil Think with Your Hands", Retrieved from: https://www.fiftythree.com/pencil, Apr. 27, 2015, 14 Pages.

"Final Office Action Issued in U.S. Appl. No. 14/714,029", dated Dec. 15, 2016, 16 Pages.

"Non Final Office Action Issued in U.S. Appl. No. 14/714,029", dated May 10, 2017, 6 Pages.

"Non Final Office Action Issued in U.S. Appl. No. 14/714,029", dated Aug. 4, 2016, 14 Pages.

Wikipedia, "Electrostatics", Retrieved from: https://en.wikipedia.org/wiki/Electrostatics, Retrieved Date: Jun. 20, 2018, 7 Pages.

"Final Office Action Issued in U.S. Appl. No. 15/896,464", dated Aug. 9, 2018, 15 Pages.

"Non Final Office Action Issued in U.S. Appl. No. 15/896,464", dated Mar. 28, 2018, 15 Pages.

"Non Final Office Action Issued in U.S. Appl. No. 15/896,464", dated Nov. 8, 2018, 17 Pages.

Dauer, Stella, "A Pen for all: universal stylus standards are taking shape", Retrieved from: https://www.androidpit.com/what-is-universal-stylus-initiative, Retrieved Date: Sep. 10, 2018, 9 Pages.

"International Preliminary Report on Patentability Issued in PCT Application No. PCT/US2016/028001", dated Aug. 10, 2017, 11 Pages.

"International Search Report and Written Opinion Issued in PCT Application No. PCT/US2016/028001", dated Aug. 2, 2016, 15 Pages.

"Second Written Opinion Issued in PCT Application No. PCT/US2016/028001", dated May 10, 2017, 10 Pages.

Rubino, Daniel, "Wacom Bamboo Ink is an excellent alternative to the Surface Pen", Retrieved from: https://www.windowscentral.com/bamboo-ink-review, Jun. 6, 2017, 19 Pages.

Wikipedia, "Electrostatic Generator", Retrieved from: https://en.wikipedia.org/wiki/Electrostatic_generator, Retrieved Date: Jun. 20, 2018, 7 Pages.

"Final Rejection Issued in U.S. Appl. No. 15/896,464", dated Jun. 11, 2019, 11 Pages.

"Non-Final Office Action Issued in U.S. Appl. No. 15/896,464", dated Aug. 28, 2019, 14 Pages.

"Office Action Issued in European Patent Application No. 16720620.0", dated Dec. 13, 2019, 10 Pages.

* cited by examiner

COUPLING A PEN DEVICE TO A COMPANION DEVICE BASED ON PEN PROXIMITY

CROSS-REFERENCE TO RELATED APPLICATION

This application claims priority to U.S. Provisional Application No. 62/696,331, filed Jul. 10, 2018, the entirety of which is incorporated herein by reference.

BACKGROUND

Many modern computing devices pair with pen or stylus devices and are configured to interact with them. Pen devices may include wireless communication capabilities that are used for inking, and off-screen control based on tail button clicks, battery state reporting, pen firmware updates, and/or telemetry. Some existing systems include the implementation of a "downlink" capability to the tip of the pen from which the identity of the pen can be established by a computing device. This enables the computing device to initiate a pairing procedure. However, these configurations have drawbacks. For example, the pen needs to be explicitly put in "pairing mode" by a long press of the tail button (e.g., the pen/device is not discoverable). Further, because of the need to explicitly have a single paired device in some systems, the pen can only target the last device on which the pairing process was completed, not necessarily the last device the user inked on (e.g., the device that the user has most recently written or drawn on with the pen device tip).

To utilize the full functionality of the pen, and not just inking, users must pair their pens with the companion devices (e.g., via Bluetooth) in existing systems. There are several ways in which Bluetooth pairing is possible, but some users do not pair their pens given the difficulties involved in current pairing processes and, therefore, do not get the benefit of the full functionality of the pen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for coupling a stylus and a computing device is described. Based on a tip of a stylus being brought proximate to a display of a computing device configured to communicate in accordance with a first wireless protocol, the computing device is configured to receive, via a communication channel of a second wireless protocol, a stylus wireless protocol identifier from the stylus and transmit, via the communication channel, a wireless protocol identifier of the computing device to the stylus in response, whereby the stylus and computing device are coupled. Based on receiving a signal associated with user input from the coupled stylus via the wireless protocol, the computing device performs an operation based on the signal.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
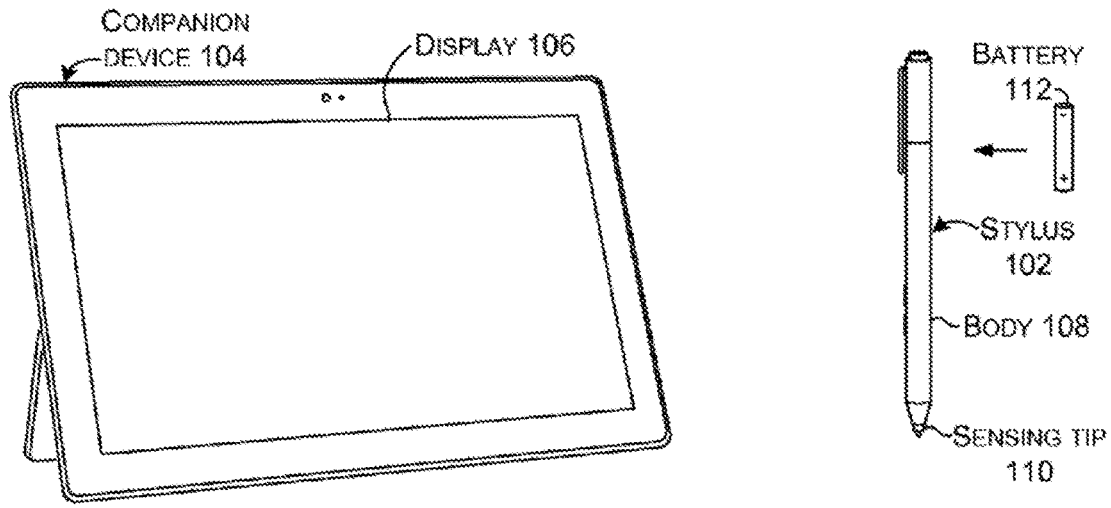
FIGS. 1-2 collectively illustrate a use case scenario explained relative to a system according to an embodiment.
Figure 1:
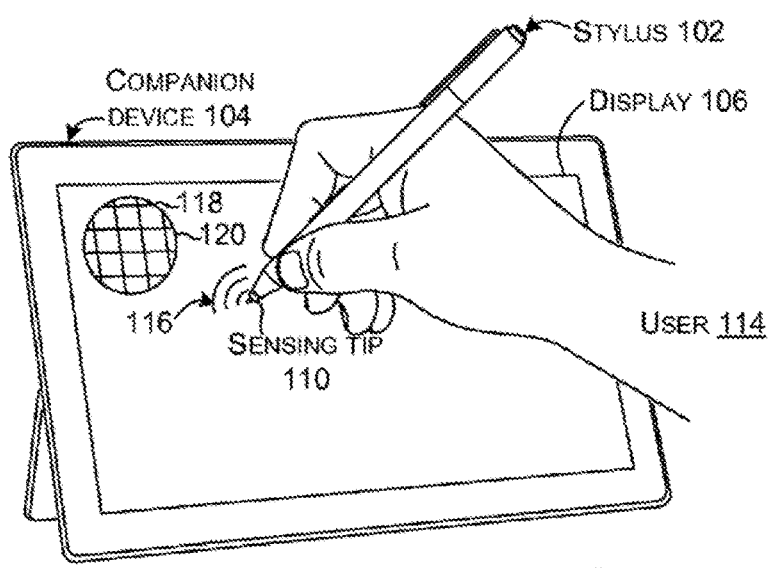
Figure 1:
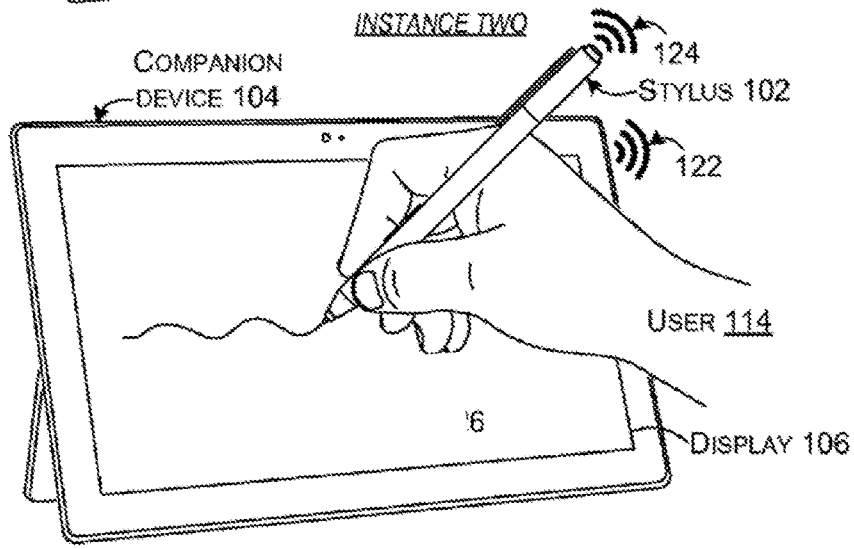

Aspects of the disclosure provide a system and method for coupling a stylus and computing device in a "loose coupling" relationship. Based on a tip of a stylus being brought proximate to a display of a computing device, the stylus and computing device are configured to exchange respective wireless protocol identifiers and security keys. Each device stores the exchanged identifiers and security keys, enabling the described coupling, but without formal or traditional pairing. User input to the stylus is received by the stylus, and indicates that a signal is to be sent to a coupled computing device using a wireless protocol other than the one used to exchange the identifiers and security keys. The stylus transmits the indicated signal to the computing device using the wireless protocol identifier of the computing device. Based on receiving a signal from the coupled stylus, the computing device performs an operation based on the signal. Performed operations may be related to the relationship between the stylus and computing device (e.g., initiating full, formal pairing, etc.) and/or associated with other functionality of the computing device (e.g., executing and/or interacting with applications, etc.). In this manner, the devices are coupled through the exchange of identifiers and security keys via a wireless protocol (e.g., a short range wireless protocol) without pairing, while other communication may occur later via another wireless protocol (e.g., a wireless protocol with a longer range than the short range wireless protocol).

The described systems and/or methods are designed to, among other items, improve the initial pairing and/or connecting experience for the user, remove the need for factory pre-pairing, and create a seamless coupling and/or connecting experience with respect to new or replacement pen devices (e.g., styluses, pens, etc.) through the formation initially of loosely coupled connections between pen devices and companion devices, such as tablets or phones, as described herein. The described systems and/or methods are configured to maintain compatibility with previous pen devices/companion devices as necessary.

The described system operates in an unconventional way by providing full pen device functionality that roams with the user's pen device, whereby it is enabled across multiple computing devices. To enable roaming seamlessly across devices, the present disclosure provides the loosely coupled connection model which is different from formal pairing. Particularly, it should be understood that "coupling" and "pairing" refer to different processes and/or states. The coupling of pen devices and companion devices and use of loosely coupled connections refer to the relationship formed between the devices based on an exchange of identification and security information prior to pairing, as described herein. Further, the pairing of pen devices and companion devices generally refers connecting the devices using a standard Bluetooth pairing process as is understood in the art. Coupling of a pen device to a companion device may occur prior to and/or independently of a pairing, bonding, or other connection or linkage of the devices.

Users that buy a stylus with their companion device expect the stylus to work with the companion device. User satisfaction can quickly diminish if the user has to read instructions and take various manual, non-intuitive actions to get the stylus and companion device to operate cooperatively. The present disclosure provides several seamless solutions so that, from the user's perspective, the stylus and the companion device work as expected with little or no user intervention/involvement.

In this manner, loosely coupling the pen and computing devices without pairing simplifies human-machine interaction by requiring fewer, or no, manual steps than traditional pairing. Further, the loose coupling configuration improves the underlying functioning of the computing device by enabling functionality previously only available after traditional pairing.

Figure 2:
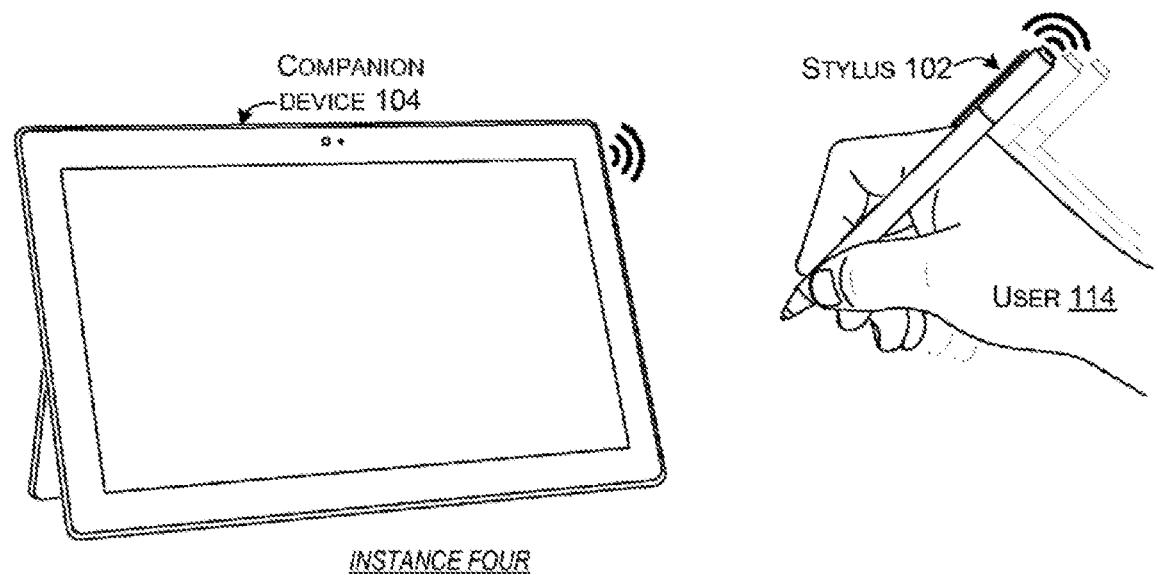
Figure 2:
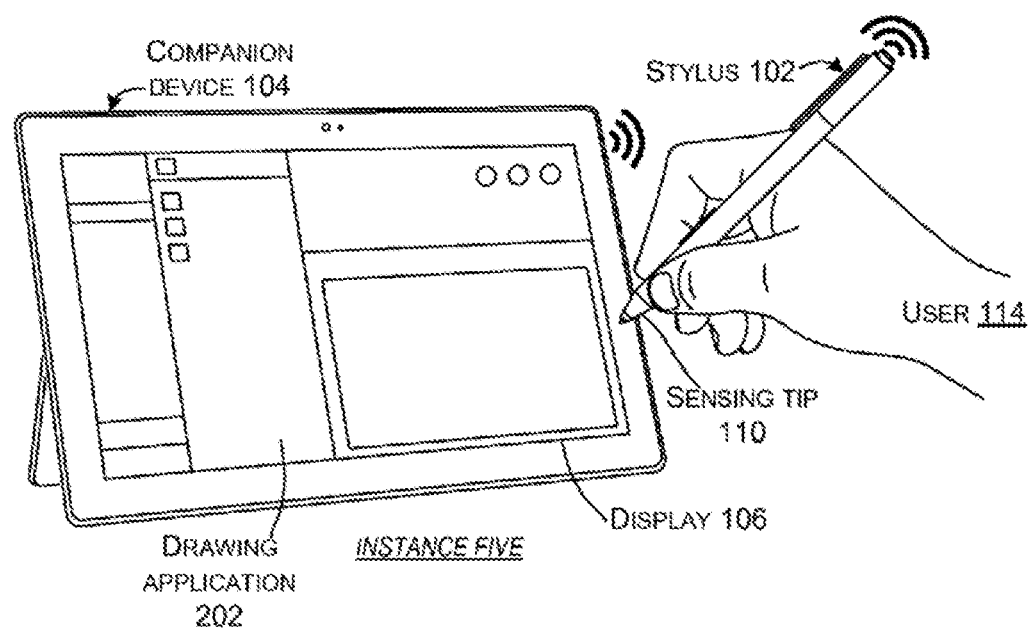

FIGS. 1-2 collectively illustrate a use case scenario explained relative to a system 100. In this case, system 100 involves a stylus 102 and a companion device (e.g., computing device) 104 having a display 106. The stylus 102 includes a body 108, a sensing tip 110, and a power source, such as a battery 112.

For purposes of explanation, this scenario begins relative to Instance One when a user 114 powers up the stylus 102 for the first time, such as by inserting the battery 112 into the stylus. For instance, the user may purchase the stylus 102 and the companion device 104 together as a set, open the packaging, and install the battery. In other cases, the battery may already be installed and the user may simply pick up the stylus for initial use.

As shown in Instance Two, upon unwrapping the stylus 102 and powering it up, the user 114 may intuitively try to write (e.g., ink) on the companion device 104's display 106 (or otherwise interact with the display) with the stylus. As the stylus's sensing tip 110 interacts (e.g., approaches and/or touches) the display 106, sensed information can be communicated between the stylus 102 and the companion device 104 as indicated generally at 116. The sensed information can be communicated in various wireless formats (e.g., via an electrostatic signal). Generally, these formats rely on close proximity of the devices involved, such as within a couple of inches. For instance, the stylus 102 can generate signals that convey the sensed information and that are picked up by the companion device 104 via a proximity sensing component, such as a digitizer 118 underlying the display 106 as shown by cut-away 120.

Normally, this sensed information 116 can relate to pressure information of the sensing tip 110 on the display 106, acceleration information relating to the sensing tip, etc. However, the present implementations may include additional information with the sensed information 116. This additional information can be wireless format (e.g., protocol) identification information about other wireless capabilities of the stylus 102. For instance, the stylus may have Bluetooth capabilities, and the wireless format identification information can relate to these Bluetooth capabilities. For example, the wireless format identification information can include a Bluetooth unique identification (e.g., manufacturing identification number or Bluetooth address) or the Bluetooth unique identification can be derived from the available wireless format identification information.

In Instance Three, the companion device 104 can use the Bluetooth unique identification received with (or derived from) the sensed information to couple with the stylus 102 as described herein, priming the companion device 104 and stylus 102 for interaction and/or communication prior to subsequent Bluetooth pairing, or entirely without subsequent Bluetooth pairing. It should be understood that, if the stylus 102 is loosely coupled to the companion device 104, a user may still pair and/or bond the stylus 102 to the companion device 104. The stylus 102 may be configured with two identifying addresses (e.g., Bluetooth addresses, etc.) to achieve this (one address for loose coupling and the second address for pairing and bonding). Coupling may include the companion device 104 storing the Bluetooth unique identification of the stylus 102 and responding to the stylus 102 by providing Bluetooth unique identification of the companion device 104. The stylus 102 may be configured to store the Bluetooth unique identification of the companion device 104 for future use during subsequent Bluetooth pairing or other use of Bluetooth communication between the coupled devices. The stylus 102 can respond to the initial communication as indicated generally at 124 and coupling, or priming, can be accomplished as described herein. This wireless protocol identification information allows subsequent pairing or related communication to be accomplished without the user 114 taking any affirmative steps, such as going to a settings menu on the companion device, selecting Bluetooth, selecting an individual device, and selecting that the individual device be paired; thereby improving the user experience by reducing the amount of user interaction required for pairing.

It should be understood that the companion device 104 may be configured to enable blocking loosely coupled connections entirely. Such configurations may be based on an organization-mandated policy or the like; by default, the loose coupling feature may be enabled.

In some examples, a graphical user interface (GUI) may be presented on companion device 104 that indicates that pairing has been commenced with the stylus 102. This example first couples the companion device 104 and stylus 102, and then performs associated Bluetooth communications, such as pairing, without any user input and instead relies on the fact that the user is using the stylus to interact with the companion device as evidence that the user wants to proceed. Further, a GUI of the companion device 104 may include a "Bluetooth and other devices" settings page that displays loosely coupled styluses (e.g., stylus 102, etc.) for interaction with a user. If the same stylus is loosely coupled to the companion device 104 and is then paired to the companion device 104 (or vice versa) the list of devices may display a unified instance of the stylus.

Some of the present implementations utilize out-of-band communications relating to display interactions to transfer information about other wireless formats of the interacting device/apparatus (e.g., stylus 102) to the display device (e.g., companion device 104). The companion device can use the information about the interacting device to establish coupling and/or communication over another wireless format, rather than relying on manual actions from the user to establish the coupling and/or communication.

FIG. 2 shows that communication subsequent to the coupling can be accomplished between the stylus 102 and the companion device 104 via a wireless format associated with the wireless identification information (e.g., in this example, Bluetooth). As shown in example Instance Four, if the user 114 subsequently activates a sensor or other interface of the stylus 102 associated with the wireless format, the stylus initiates pairing or otherwise communicates with the companion device 104 based on the coupling and causes the companion device to launch a drawing application (or take another action). As shown in example Instance Five, the drawing application (e.g., drawing application GUI) 202 is launched and ready for the user to use on the companion device 104 before the stylus 102 even approaches the companion device's display 106.

As an alternative to launching an application, the user 114 may select an 'eraser' feature on the stylus 102 (e.g., via a button press), and this information is communicated to the companion device 104 based on the stored identification information shared during coupling so that when the stylus's sensing tip 110 approaches the display 106, visual content is erased rather than drawing/inking new content.

Figure 3:
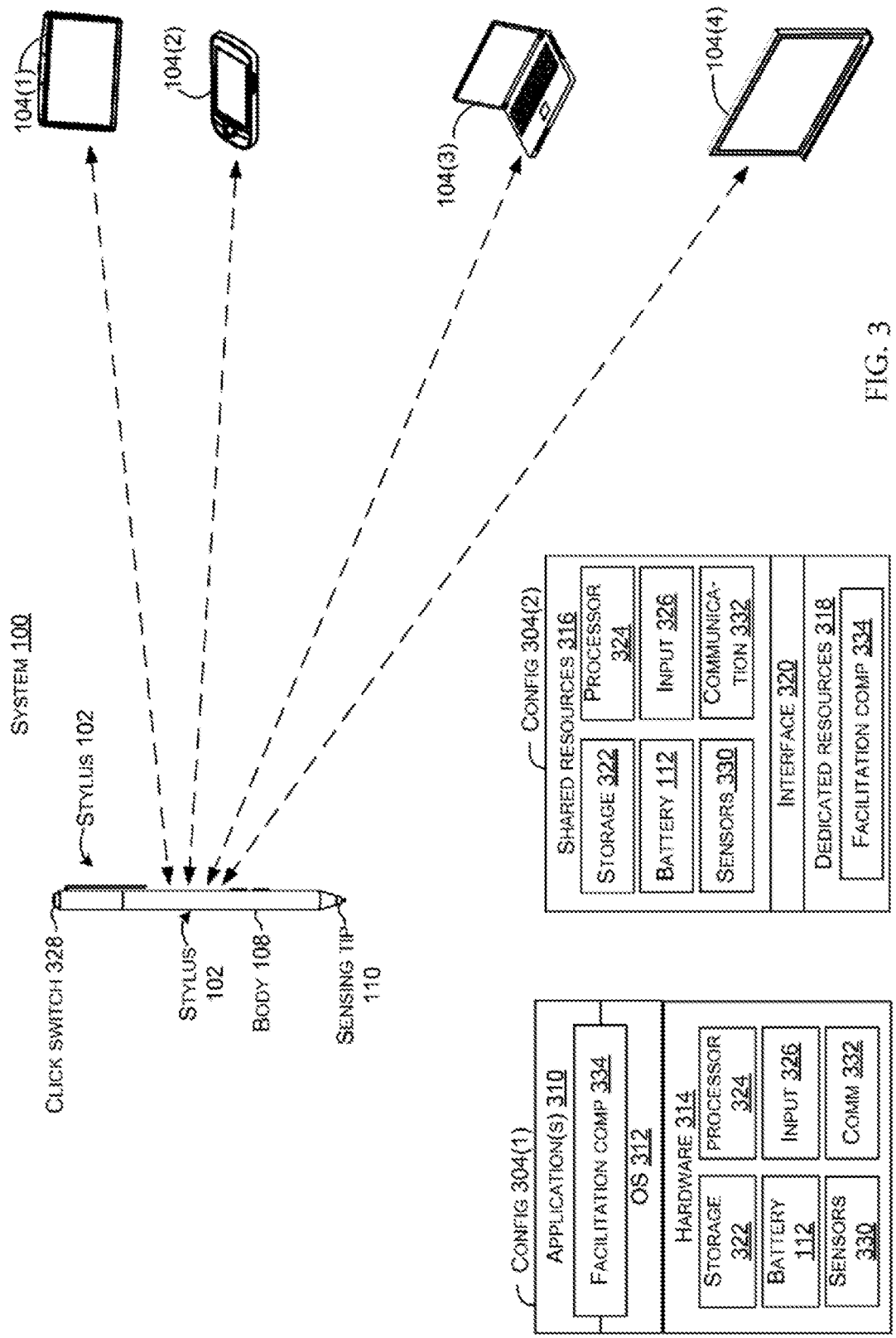
FIG. 3 shows a system and offers details about a stylus and companion device according to an embodiment.

FIG. 3 shows system 100 and offers details about stylus 102 and/or companion device 104. The stylus 102 and the companion devices 104 are in and of themselves types of computing devices. In this case, system 100 includes several example companion devices 104(1)-104(4). Companion device 104(1) is manifest as a tablet type device similar to device 104 of FIGS. 1-2, companion device 104(2) is manifest as a smart phone type device. Companion device 104(3) is manifest as a notebook computer type device and device 104(4) is manifest as a digital whiteboard type device.

Two example device configurations 304(1) and 304(2) are illustrated that can be used to implement stylus 102 and/or companion devices 104. Briefly, configuration 304(1) represents an operating system centric configuration, and configuration 304(2) represents a system on a chip configuration (SOC). Configuration 304(1) is organized into one or more applications 310, operating system 312, and hardware 314. Configuration 304(2) is organized into shared resources 316, dedicated resources 318, and an interface 320 therebetween.

In either configuration 304(1) or 304(2), the stylus 102 and/or companion device 104 can include storage/memory (e.g., computer-readable storage media) 322, a processor 324, a battery 112 (or other power source), and input assemblies 326. In this case, the input assemblies are manifest as a click switch 328. Both configurations can also include sensors 330. Examples of sensors can include: pressure sensors, proximity sensors, accelerometers, gyroscopes, inertial sensors, capacitors, magnetometers, and/or microphones, among others. A specific sensor that is discussed in detail is a pressure sensor. Either configuration can include a wireless communication component(s) 332 and/or a facilitation component 334. The communication component 332 can include transmitters and/or receivers for communicating over various electromagnetic wavelengths in compliance with various formats (e.g., protocols), such as 2.4 to 2.485 GHz in the case of Bluetooth.

The sensing tip's pressure sensors may be positioned to detect when sensing tip 110 contacts display 106. Similarly, electrostatic receivers detect proximity of the sensing tip to a surface as the tip approaches the surface but before physical contact via capacitance or other mechanism. In some configurations, the electrostatic receivers function as proximity detectors to the companion device 104 so that the stylus 102 transmits proximity information and wireless format identification information to the companion device 104.

The companion device 104 can include a proximity sensing component manifest as a 'pen sensor' (e.g., a sensor 330) configured to receive the proximity information and wireless format identification information from the stylus 102. The pen sensor can be associated with the companion device's display 106 (designated in FIG. 2) or the pen sensor can be independent of the display. For instance, the pen sensor is integrated into the display as a display component. In another case the pen sensor is associated with the display as a separate component. For example, the display is manufactured as a display module and then the pen sensor is bonded to the display module in a subsequent process. In still another configuration, the pen sensor is a component of the companion device that is not physically associated with the display.

In the illustrated configuration of the stylus 102, the sensing tip 110 protrudes from one end of the body 108. Other implementations may employ sensing tips from both ends of the body and/or within the body. Further, sensing tips can be employed on other form factors besides the illustrated 'pen-like' configuration.

The communication component 332 can allow the stylus 102 to communicate with various companion devices, such as the illustrated companion devices 104(1)-104(4). The communication component can include a receiver and a transmitter and/or other radio frequency circuitry (and/or other components, such as analog-to-digital converters, rectifiers, etc.) for communicating via various formats, such as cellular, Wi-Fi (IEEE 802.xx), Bluetooth, etc. Example communication components are described below relative to FIG. 4.

Instances of facilitation component 334 can occur on the stylus 102 and/or companion device 104. In some implementations, the facilitation component 334 is manifest as part of the operating system 312, application 310, an application part, and/or an application program interface, among other options. The functionality performed by the facilitation components on various devices may be similar or different. For instance, in one case, the facilitation component on the stylus 102 stores the wireless format identification information of the stylus 102, causes this information to be communicated to the companion device 104, receives wireless format identification information from the companion device 104, and stores the received identification information from the companion device 104. In contrast, the facilitation component 334 on the companion device may identify (or otherwise distinguish) the sensor information from the wireless format identification information of the stylus 102, process the wireless format identification information, cause the communication component to store the wireless format identification information, communicate wireless format identification information of the companion device 104 to the stylus 102, and, based on coupling with the stylus 102 as described herein, subsequently contact the stylus's communication component and begin the pairing process as defined by the Bluetooth protocol (or other protocol) and/or otherwise communicate with via the Bluetooth protocol (or other protocol). Once pairing is complete or another method of communication is established based on the coupling, the facilitation component 334 can facilitate actions on the companion device 104 upon receiving Bluetooth communications from the stylus 102. For instance, the user 114 may select an 'erase' function on the stylus. This may cause the stylus 102 to communicate to the companion device 104 with which it is coupled and the 'erase' function information can be communicated over Bluetooth communications to the companion device. The facilitation component can then cause the stylus's functionality to switch from 'draw' to 'erase' on the companion device as the user engages the display with the stylus. Of course, the facilitation component can cause other actions (whether predefined or user defined) upon receiving information from the stylus received via Bluetooth communications.

Stylus 102 and companion devices 104(1)-104(4) are considered to be computing devices. The term "device," "computer," or "computing device" as used herein can mean any type of device that has some amount of processing capability and/or storage capability. Processing capability can be provided by one or more processors 324 that can execute data in the form of computer-readable instructions to provide a functionality. Data, such as computer-readable instructions and/or user-related data, can be stored on storage 322, such as storage that can be internal or external to the computer.

As mentioned above, configuration 304(2) is considered to be an SOC type design. In such a case, functionality provided by the device can be integrated on a single SOC or multiple coupled SOCs. One or more processors 324 can be configured to coordinate with shared resources 316, such as memory/storage 322, etc., and/or one or more dedicated resources 318, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 4:
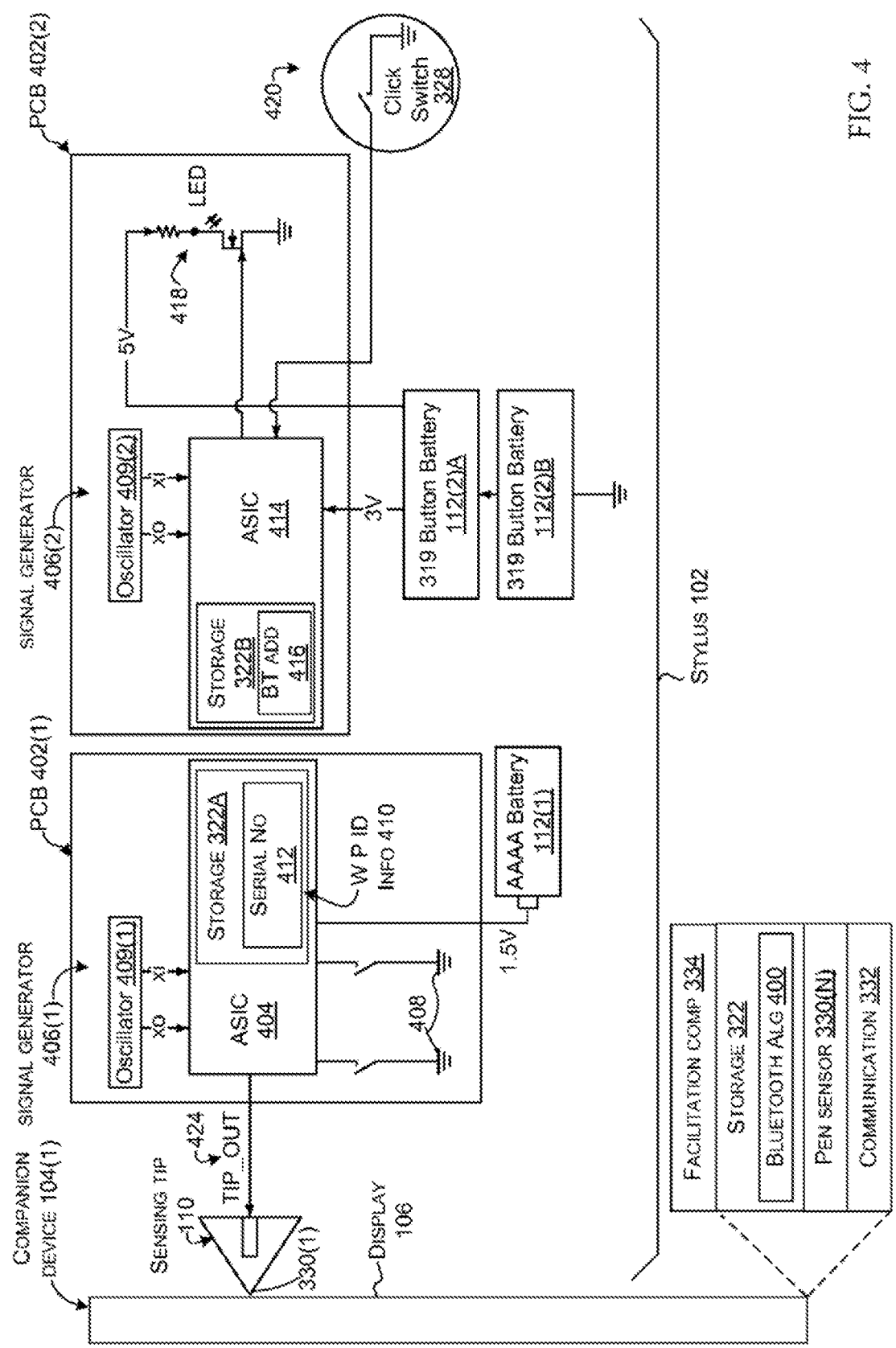
FIG. 4 shows additional details about one example "system on a chip" (SOC) implementation of a stylus according to an embodiment.

FIG. 4 shows additional details about one example SOC implementation of stylus 102. The stylus's sensing tip 110 is touching display 106 of companion device 104(1). Illustrated elements of the companion device include facilitation component 334, storage 322, a Bluetooth address generation algorithm 400, a pen sensor 330(N), and a communication component 332.

This particular implementation of stylus 102 includes two separate printed circuit boards, PCB 402(1) and PCB 402(2), powered by two separate batteries 112(1) and 112(2), though the functionality could be achieved on a single integrated PCB powered by a single battery. In this case, battery 112(1) is manifest as a AAAA battery generating 1.5 volts and battery 112(2) is manifest as two 319 button batteries connected in series to generate 3 volts.

PCB 402(1) includes an ASIC 404 and a signal generator 406(1) for generating signals of specific frequencies. Sensor tip 110 includes a pressure sensor 330(1) that is connected to the ASIC 404. The ASIC 404 is also connected to battery 112(1) and selectively to ground 408. In this case, signal generator 406(1) is manifest as an oscillator 409(1) and the ASIC 404. The ASIC 404 also includes storage 322A that has wireless protocol identification information 410 that is manifest as a device serial number 412.

PCB 402(2) includes another ASIC 414 and a signal generator 406(2) in the form of an oscillator 409(2). In this case, the ASIC 414 can function as a Bluetooth radio. The ASIC 414 can include storage 322B that has a Bluetooth random static address (Bluetooth (BT) address) 416 stored thereon. The ASIC 414 is driven by two 319 button batteries 112(2)A and 112(2)B. The batteries also drive a power on indicator assembly 418. A user activatable input assembly 420 in the form of click switch 328 is connected to the ASIC 414. ASIC 404 and the signal generator 406(1) can function as a communication component (332, FIG. 3). Similarly, ASIC 414 and signal generator 406(2) can function as a communication component, or alternatively, ASIC 404, signal generator 406(1), ASIC 414, and signal generator 406(2) can be viewed as a single communication component.

Traditionally, Bluetooth pairing between the stylus 102 and the companion device 104(1) requires multiple, manual steps to be performed by the user, such as going to a settings menu, finding the Bluetooth option, identifying the device to be paired, etc. Further, the user may not even know that the stylus has Bluetooth capabilities and thus not even know to complete the pairing process. The present disclosure describes a process of loosely coupling the stylus and companion device that may be used instead of, or in conjunction with, a standard Bluetooth pairing process or other similar pairing process.

In this example, the device serial number 412 is assigned to the stylus 102 during manufacture, such as by an entity manufacturing the stylus or a component thereof, such as the PCB 402(2). The device serial number 412 can be processed by Bluetooth address generation algorithm 400 to produce the Bluetooth address 416. Such an example algorithm is the SHA1 or SHA256 algorithm. An example application of the SHA1 Bluetooth address generation algorithm is provided below. The Bluetooth address 416 can be thought of as the over the air address or GAP address (e.g., the address used to communicate with the Bluetooth radio provided by the ASIC 414).

Example Bluetooth address generation algorithm 400 includes:
 P:=A unique identifier (e.g., device serial number 412) for the pen (e.g., stylus 102).
 S:=A unique hashing seed (128 bit)
 Sha1( )=Sha1 standard algorithmic provider.
 Hash=sha1(sha1(S), P);
 Bt_Address |=0xc00000000000;
 Bt_Address &=0xffffffffffff In the present scenario, the ASIC 414 is configured to perform Bluetooth loose coupling operations as described herein. Other implementations using other wireless protocols can perform operations to implement loose coupling that are compliant with the individual wireless protocol. Upon interaction with display 106, the pressure sensor 330(1) can convert mechanical pressure on the sensing tip 110 to an output signal (e.g., TIP_OUT) pressure value 424. The ASIC 404 can receive the output signal pressure value 424 and represent the output signal pressure value by modulating signals generated by the signal generator 406(1). In this case, the signal generator is manifest as oscillator 409(1). The ASIC 404 can further modulate the signals generated by the signal generator 406(1) to convey device serial number 412.

The companion device's pen sensor 330(N) operating cooperatively with communication component 332 can receive the modulated signals from the signal generator 406(1) of stylus 102. The companion device's facilitation component 334 can identify portions of the signals conveying tip sensing information and portions of the signals conveying the serial number 412 and/or an associated Bluetooth low energy (BLE) address of the stylus 102. The facilitation component can process the serial number 412 with the Bluetooth address generation algorithm 400 (e.g., the same algorithm that was used to generate the Bluetooth address 416 for the stylus 102). The facilitation component can compare the Bluetooth address 416 to a listing of Bluetooth devices (stored in storage 322) that the companion device is already loosely coupled with and/or has already paired with. If the stylus is already on the list of coupled or paired devices, the facilitation component can stop processing. If this is the initial use of the stylus 102 with the companion device 104(1) (e.g., the stylus is not on the list of coupled or paired devices), the facilitation component can cause the communication component to use the Bluetooth address 416 to contact the stylus 102. The communication component can then communicate with the stylus in accordance with the coupling process described herein. Once coupling is complete, the user can use click switch 328 to cause the stylus 102 to pair with or otherwise communicate with the companion device 104(1) in order to control the companion device 104(1). For instance, the user may use the click switch to launch an application, switch stylus contact from 'drawing' to 'erasing', or 'add a note,' among others.

From one perspective, the Bluetooth address 416 (e.g., GAP address) generated from serial number 412 (e.g., Pen ID) can be used to enable out of band or loose coupling and/or pairing since the serial number can be communicated to the companion device operating system (312, FIG. 3) via stylus human interface device (HID) reports when the stylus's sensing tip 110 is interacting with the display 106 of the companion device 104(1). An operating system driver or application can decode the serial number to the Bluetooth address using the same Bluetooth address generation algorithm and initiate the coupling process described herein by passing the Bluetooth address to the appropriate operating system application program interface (API). If the Bluetooth address decoded from the serial number is already coupled or paired, then it can stop the process. Similar implementations can be accomplished for other wireless formats/protocols.

In this implementation, the serial number 412 can be smaller (e.g., less bytes) than the Bluetooth address 416. Thus, communicating the serial number 412 to the companion device 104(1) rather than the Bluetooth address 416 is less resource intensive for the stylus 102. The companion device 104(1) thus obtains the Bluetooth address indirectly by processing the received serial number 412 with the Bluetooth address generation algorithm 400, such as the above mentioned SHA1 or SHA256. Other implementations can instead convey the Bluetooth address directly to the companion device via signal generator 406(1).

Further, the stylus 102 may be configured to obtain a BLE address, or other similar address, and/or security key(s) of the companion device 104(1) during the loose coupling process. It is intended that the BLE address is obtained via the pen tip 110 from the digitizer of the display 106 while inking. This address may be stored in non-volatile memory (e.g., storage 322A, 322B, etc.) until a different address is obtained, at which time the old address may be replaced. Alternatively, the stylus 102 may be configured to retain multiple host BLE addresses for use as described herein. Further, multiple styluses may be paired and bonded and/or loosely coupled to one companion device 104(1) at the same time and the click functionality may work for each stylus on that companion device 104(1). The companion device 104(1) and/or stylus 102 may be configured to enable users to remove any stylus-companion device association.

The stylus 102 and associated companion device 104(1) are configured to provide functionality based on being coupled or paired and using Bluetooth wireless communications. For instance, user input through the assembly 420 of the stylus 102 may cause a signal to be communicated to the companion device 104(1), further causing the companion device 104(1) to perform an associated operation as described herein. Functionality enabled by the stylus 102 and companion device 104(1) may be based on the use of stylus-based communication services that may be interpreted by the companion device 104(1).

In an exemplary embodiment, these stylus-based communication services may use vendor-specific base UUID E766xxxx-3F85-40F5-8745-284E9095A1E2. Exemplary service details are provided below, though the disclosure is operable with other configurations. In some examples, services may include a pen service (e.g., service UUID 0x1000, etc.) configured to report button activity and battery status, a "click" service characteristic (e.g., service UUID 0x2000, etc.), a "pen ID" service characteristic (e.g., service UUID 0x2001, etc.), a "pen serial number" service characteristic (e.g., service UUID 0x2002, etc.), a "pen descriptor" service characteristic (e.g., service UUID 0x2003, etc.), a "service session key" service characteristic (e.g., service UUID 0x0010, etc.), and/or an "implied sign counter" service characteristic.

In some examples, the "click" service characteristic may include a 16-byte data field that is openly notifiable but not readable or writable. The field may include a button identifier that indicates buttons of the stylus being clicked (e.g., a byte 0 with data values of 0x00 for "no button", 0x01 for "click button", and 0x10 for a "barrel button 1", etc.). A "click type" data field (e.g., a byte 1 of the click service data field, etc.) may indicate a type of click that has been performed. Exemplary click types and associated data codes are provided below.

| Code | Click Type | Additional Information |
| --- | --- | --- |
| 0x10 | Single click | Used in peripheral processing model. Legacy HID mode sent Lwin + F20. |
| 0x11 | Double click | Used in peripheral processing model. Legacy HID mode sent Lwin + F19. |
| 0x12 | Press-hold | Used in peripheral processing model. Legacy HID mode sent Lwin + F18. |

A given button uses either the pressed/released messages or the single/double/press-hold messages depending on whether button processing is done in the peripheral or on the host. In an example, the tail click button of the stylus may use the single/double/press-hold click types.

Further data fields of the click service data field may include a "battery level" data field (e.g., a byte 2 of the data field that provides the battery life remaining in a percent data value, etc.). The battery level data field may further report that no reading is available (e.g., a value of 0xFF, etc.) and/or report the battery level without an associated click (e.g., by setting the button identifier to a "no button" value, etc.). The click service data field may also include reserved bytes (e.g., a byte 3 of the data field, etc.). Such reserved bytes may be set to zero or other values.

In some examples, a portion of the click service data field (e.g., bytes 4 through 15, etc.) of the click service data field may be associated with an encryption signature (e.g., a count value and an Advanced Encryption Standard cipher-based message authentication code (AES-CMAC) according to Bluetooth Core 5.0, section 3, Part f, 3.4.5.4, etc.).

The pen ID service characteristic of the pen service as described herein may be a four-byte data field that contains the pen ID of the pen device. It may be configured to be openly readable but not writeable. Further, the pen serial number service characteristic of the pen service may be a 16-byte data field containing the serial number of the stylus in an ASCII format. Unused bytes may be set to zero. It may be configured to be openly readable but not writeable.

The pen description service characteristic of the pen service as described herein may be a one-byte data field that contains data indicating whether the associated stylus is rechargeable (e.g., a "0" indicating the device is not rechargeable, a "1" indicating the device is rechargeable, with other values 2-255 reserved, etc.). The data field may be configured to be openly readable but not writeable.

The service session key characteristic of the pen service as described herein may be a four-byte writable field for storing a Service Session Key. Once connection between pen and host is established, the host sends a new randomly generated Service Session Key to the pen. The pen remembers one Service Session Key per each service which has signed data exchange. This key is only stored for duration of one connection. Once the associated connection is dropped, a new key must be received by the stylus for future connections.

The implied sign counter characteristic of the pen service as described herein may be a four-byte variable for storing data associated with a sign counter. Once a connection between the stylus and host is established, the host and stylus each allocate a 32-bit sign counter with initial value 0. Separate sign counters are maintained for every service that has an active signed data exchange. The first message from the stylus is defined to have a sign counter value 1. Each sign counter is incremented before every new message is sent by the stylus. The host does not send a sign counter value to the stylus. The host validates that all messages from the stylus have a sign counter value greater than in previous accepted message in the same connection and the same service. The sign counters associated with a connection are only persisted during the connection duration.

In some examples, data size and content for a button click notification and/or other associated notifications from the stylus may include 4 bytes for button click data, 4 bytes for a sign counter, and 8 bytes for a Service Session Key. Initial signing procedure between the stylus and host may include a message in the following pattern: Service Session Key (4 bytes)||Button Click Data (4 bytes)||Sign Counter (4 bytes).

Sign counters are configured to be unique per service to prevent replay attacks within the same service and connection. Random service session keys prevent replay attacks where data from one connection or service is replayed in another connection or service. Implementing the described signing procedure and notification procedure may prevent malicious replay, sniffing, and spoofing attacks that can lead to denial of service (e.g., when pen button clicks are not received by the host, etc.) or malicious injection attacks (e.g., when unauthorized pen button clicks are injected into the system, etc.).

Figure 5:
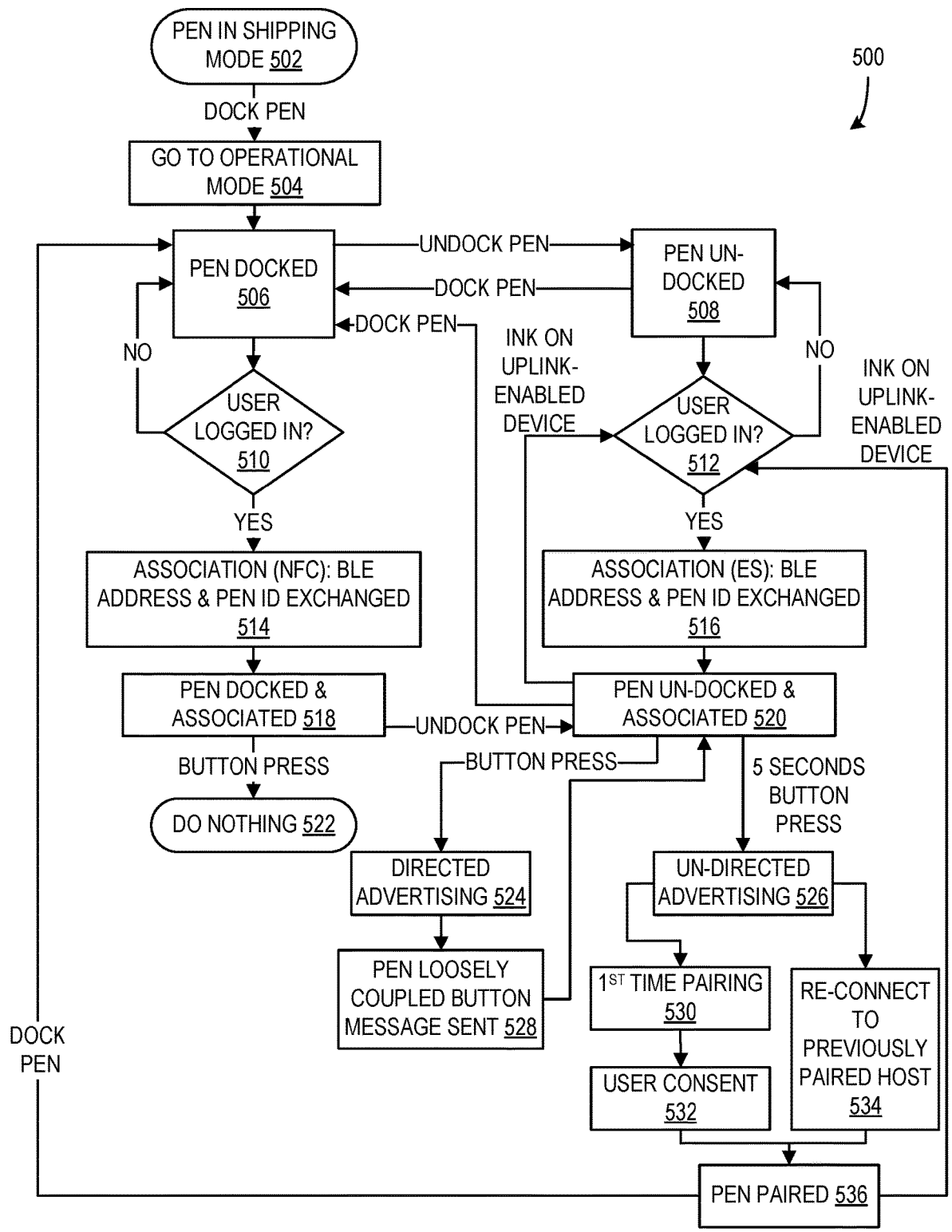
FIG. 5 shows a flowchart describing exemplary operations of a system including a pen device and an associated companion device according to an embodiment.

FIG. 5 shows a flowchart describing exemplary operations of a system including a pen device and an associated companion device. The pen begins in "shipping mode" (e.g., an inactive mode, etc.) at 502 and, upon docking to the companion device, the pen goes to "operational mode" (e.g., an active mode, etc.) at 504. The pen may transition from being docked (at 506) to being undocked (at 508) as it is used by a user.

If the user is logged in when the pen is docked at 510, a loose coupling association may be formed between the pen and the companion device as described herein. In this case, the association may be formed via near field communication (NFC) or other short ranged wireless communication (e.g., via a wireless local area network (LAN) controller (WLC), etc.) at 514. In some examples, the docking-based association may occur in less than 500 milliseconds after the pen is docked to the companion device.

Alternatively, or additionally, if the user is logged in when the pen is undocked at 512 and used to ink on the screen of the companion device, the loose coupling association may be formed between the pen and the companion device based on an electrostatic (ES) transmission of data as described herein at 516. This "uplink" communication (e.g., a digitizer-to-pen ES communication channel, etc.) is used to facilitate connecting and/or re-connecting to the companion device on which the pen is inking by sharing identification information and/or secure key information as described herein. In some examples, the ES-based association may occur in less than 150 milliseconds from the host to the pen and less than 100 milliseconds based on continuous inking input.

In an example, if a user has docked a pen to a first device for charging but has also used it recently for inking on a second device, the coupling association is with the second device until a user has inked on the first device or explicitly paired or reconnected to the first device. Alternatively, the pen may default to the device to which it is docked, rather than the device on which it has most recently inked. Further, when a user moves a pen from a first device to a second device and back, BLE functionality is available immediately after receiving first device's address. It is not necessary to receive an authentication key or keys again before BLE functionality is enabled on the first device. In some examples, this may be valid for at least 4 companion devices (the pen stores keys for at least 4 companion devices).

Once associated, the buttons and/or other interfaces of the pen may be used to cause the companion device to perform operations as described herein. If the pen is docked and associated at 518 and the button is pressed, then the companion device may be configured to do nothing at 522. However, if the pen is undocked and associated at 520 and the button is pressed, the pen may directly advertise to the associated companion device, based on the most recently obtained BLE address of the companion device, at 524 and send a message associated with he pressed button at 528. In some examples, following a pen button press, the pen sends the button event to the associated host device and the button events are translated and injected into the input stack. Alternatively, or additionally, if the button press exceeds 5 seconds, or, in other examples, a different threshold, the pen may transition into un-directed advertising at 526 in order to perform a Bluetooth pairing operation according to the known Bluetooth processes (e.g., $1^{st}$ time pairing processes at 530 including user consent at 532, re-pairing processes at 534, etc.), resulting in the pen being paired at 536. Alternatively, or additionally, in examples where no BLE address is available (e.g., the pen is not associated with a companion device, etc.) when connection is desired, the pen may indicate an error condition by blinking the LED.

It should be understood that a pen configured as described herein may be used with legacy companion devices or companion devices that are not uplink-enabled (e.g., configured for loose coupling, etc.) by using known Bluetooth pairing processes. Further, a companion device configured as described herein may also be paired with legacy pens or pens that are not uplink-enabled using known Bluetooth pairing processes.

It should be understood that, when the pen enters undirected advertising mode via button press and hold at 526, the pen may advertise in a high-power mode for 2 minutes or another defined time period. If pairing does not occur within the time period, the pen may stop advertising. Further, when pen enters advertising mode, it advertises for the specified duration, overriding any sleep timer or the like.

In some examples, following a 5-second tail button press, the pen goes into advertising mode even if it is associated to a companion device in range (i.e., via a loosely coupled connection). If the pen is loosely coupled to a device, the long-press event may be sent to the companion device before going into advertising mode. If the pen is paired/connected to a companion device in range and the button is pressed for 5 seconds, the pen does not lose its bonding information and does not go into advertising mode, similar to other pen devices.

Figure 6A:
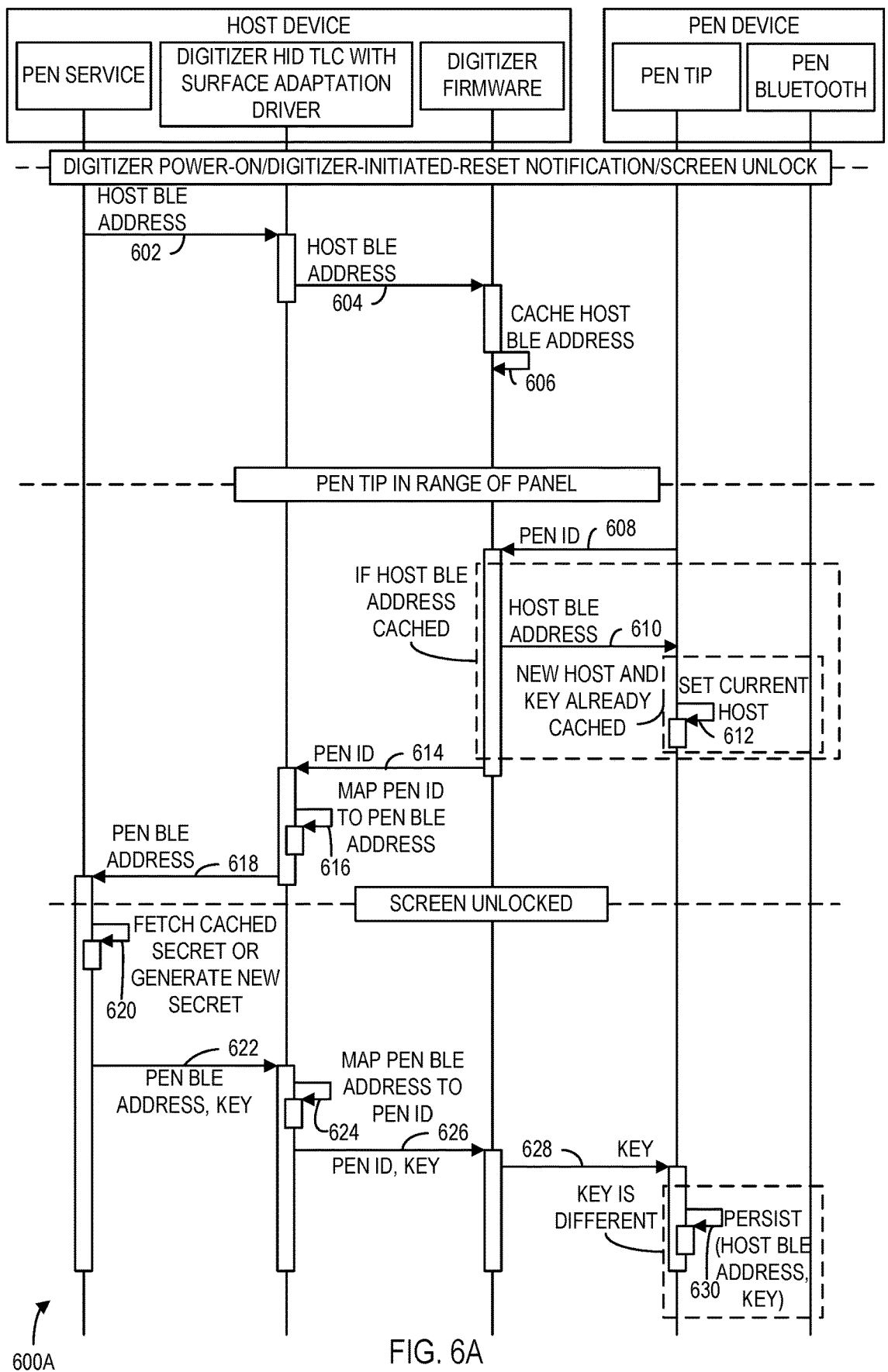
FIGS. 6A-C are sequence charts illustrating exemplary operations of a system 100 according to an embodiment.
Figure 6B:
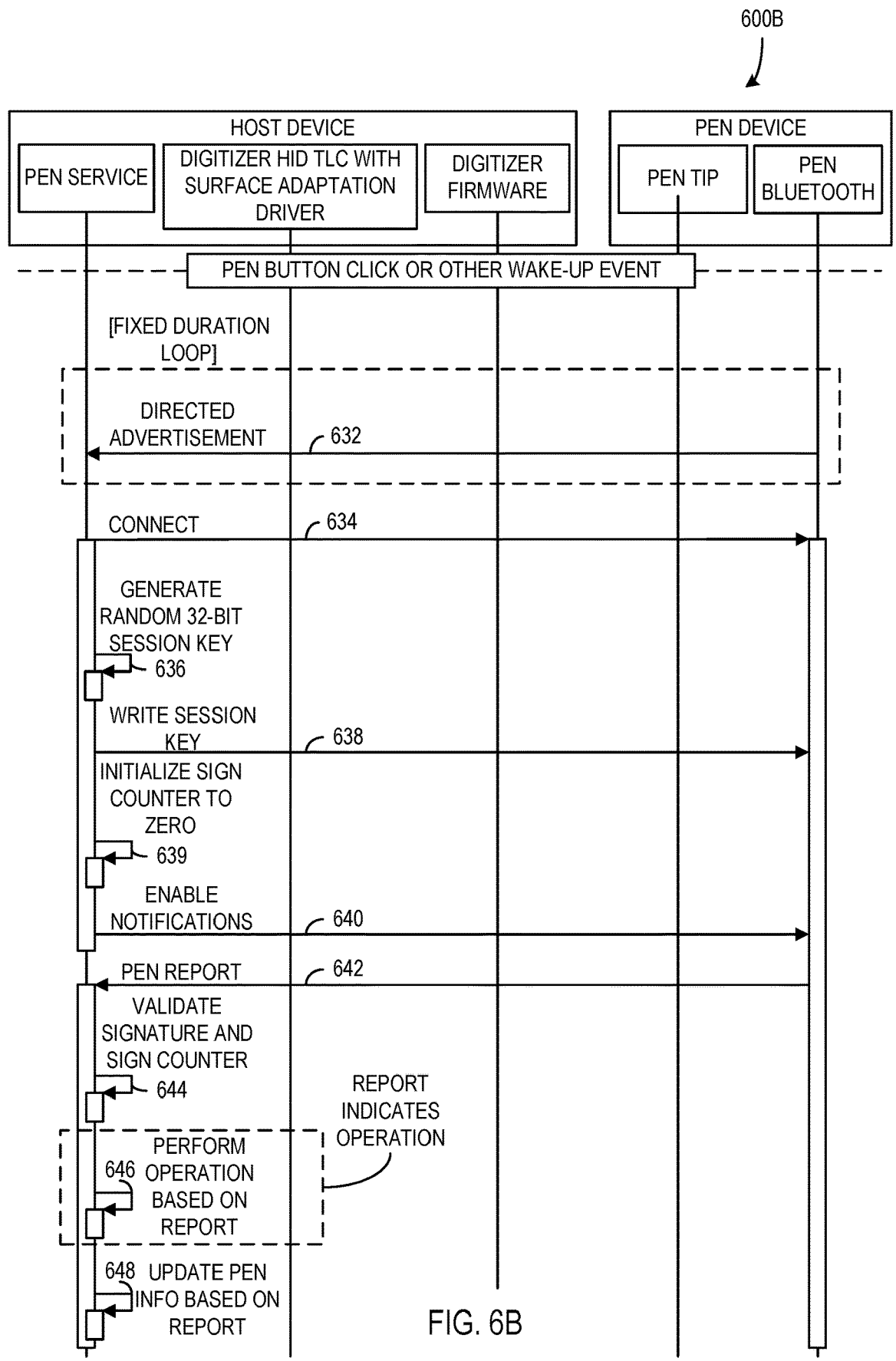
Figure 6C:
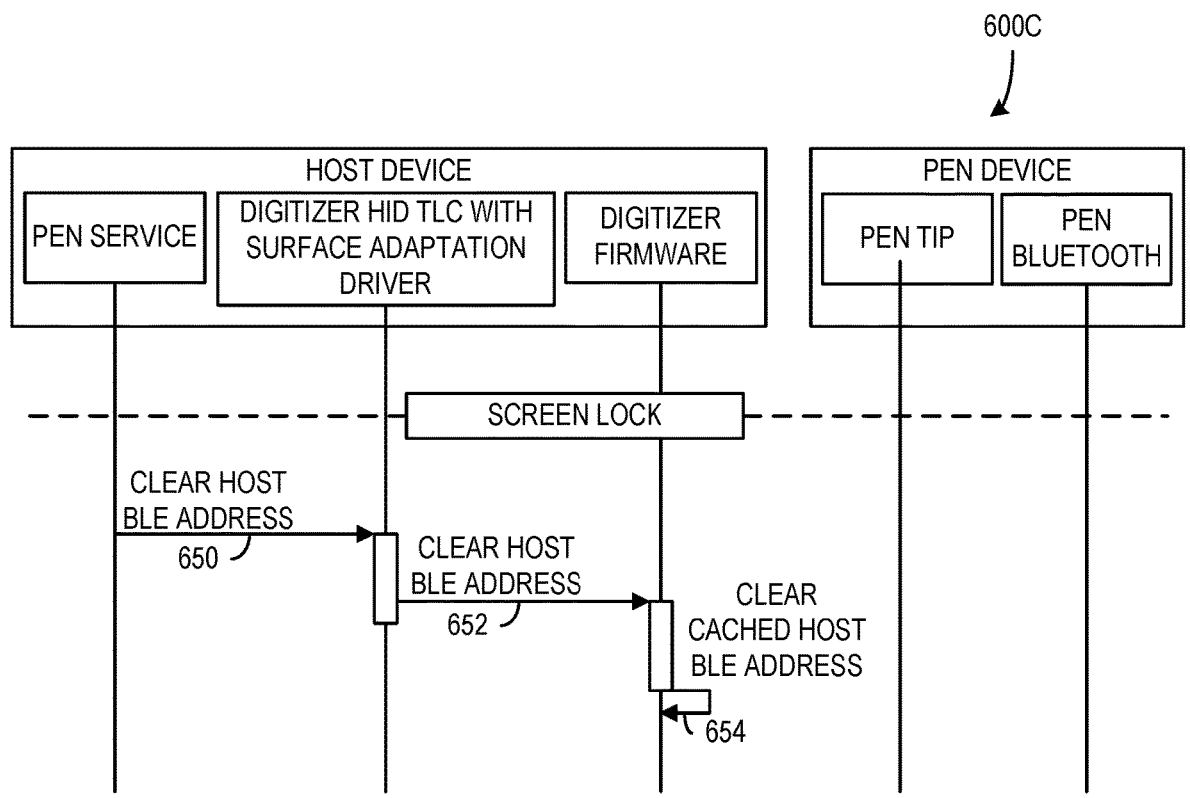

FIGS. 6A-C are sequence charts that illustrate exemplary operations of a system 100 according to an embodiment. The system includes a host device (e.g., companion device 104, etc.), also described as a companion device below, with a pen service, a digitizer driver (e.g. digitizer HID TLC with adaptation driver, etc.), and associated digitizer firmware. Further, the system includes a pen device (e.g., stylus 102, etc.) with pen tip and pen Bluetooth components.

FIGS. 6A-C illustrate several processes of the system as described herein. A first process, illustrated in FIG. 6A, occurs when the digitizer is powered on, when a digitizer-initiated-reset notification is received, or when the screen associated with the digitizer unlocks. The pen service sends the host BLE address to the digitizer driver at 602. The digitizer driver sends the received host BLE address to the digitizer firmware at 604. Finally, the digitizer firmware caches the host BLE address at 606.

Another illustrated process in FIG. 6A occurs when the pen tip component is in range of the digitizer panel. At 608, the pen tip component sends a pen ID to the digitizer firmware. If the host BLE address is cached in the digitizer firmware, the digitizer firmware sends the cached host BLE address to the pen tip at 610. If the host is a new host and an authentication key is already cached, the pen tip component sets the host as the current host at 612.

The digitizer firmware then sends the received pen ID to the digitizer driver at 614. At 616, the digitizer driver maps the pen ID to the pen BLE address and, at 618, sends the pen BLE address to the pen service. If the screen of the host device is unlocked, the pen service fetches a cached secret key or generates a new secret key at 620. The pen service then sends the pen BLE address and key to the digitizer driver at 622. The digitizer driver maps the pen BLE address to the pen ID at 624 and sends the pen ID and key to the digitizer firmware at 626. Using the pen ID, the digitizer firmware sends the key to the pen tip component at 628. If the key is different than a key stored by the pen device, the pen tip component persists with the host BLE address and key at 630. This process may result in the pen and host device being loosely coupled. Following this association of pen to host device, all Bluetooth functionality is sent to this associated host. Association of pen to host device remains until the pen is associated or connected to a different host device. If there is a current BLE transaction in process, it is terminated; if this happens during a key-press event, termination would occur after the key-up event.

Another process is described in FIG. 6B that occurs when a pen button is clicked or another wake-up event initiated with respect to the loosely coupled pen device and host device. At 632, during a fixed loop duration, the pen Bluetooth component sends directed advertisement to the pen service. Upon receiving the directed advertisement, the pen service connects to the pen Bluetooth at 634. The pen service then generates a random 32-bit session key at 636 and writes the session key to the pen Bluetooth at 638. In some examples, the pen service initializes a sign counter to zero at 639 for use in communications with the pen device as described herein. The pen service enables notifications of the pen Bluetooth at 640 and the pen Bluetooth responds with a pen report at 642. The pen report may include a variety of data, such as button event data or other user input data, battery level data, and/or telemetry data. At 644, the pen service validates a signature and sign counter received with the pen report to verify the communications with the pen device. The signature may be based on a previously generated signing key as described herein. If the pen report indicates that an operation is to be performed by the host device and/or, specifically, the pen service, the pen service performs an operation based on the report at 646. Alternatively, the pen service may cause another component of the host device to perform the indicated operation. For instance, operations may include injecting button click data when button click data is present in the report and/or reporting battery status of the pen device when battery data is present in the report. At 648, the pen service updates the locally stored pen information based on the pen report as well (e.g., updating the last seen timestamp, pen friendly name, etc.). The host device may be configured to only receive loosely coupled Bluetooth connections from associated and authenticated pens (e.g., connections from new pens which have not inked on the host or docked to it are rejected, etc.). A user may remove a loosely coupled pen from the host device. Upon removal, Bluetooth functionality from the pen is no longer acted upon by the host device until a new association or pairing takes place.

Yet another process in FIG. 6C is described that occurs when the screen of the host device is locked. At 650, the pen service sends a "clear host BLE address" command to the digitizer driver and, at 652, the digitizer driver forwards the "clear host BLE address" command to the digitizer firmware. At 654, the digitizer firmware clears the cached host BLE address.

Figure 7A:
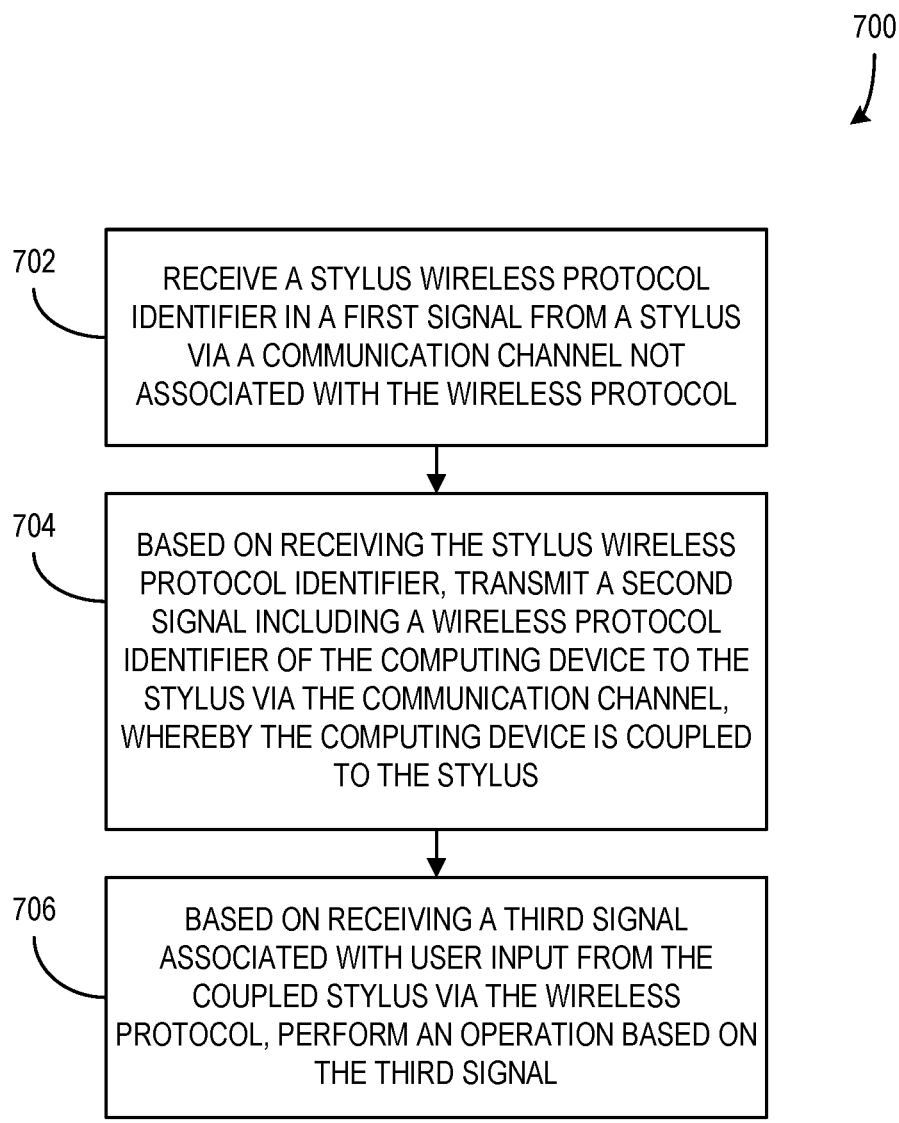
FIGS. 7A-B show flowcharts describing exemplary operations of a computing device and an associated stylus respectively according to an embodiment
Figure 7B:
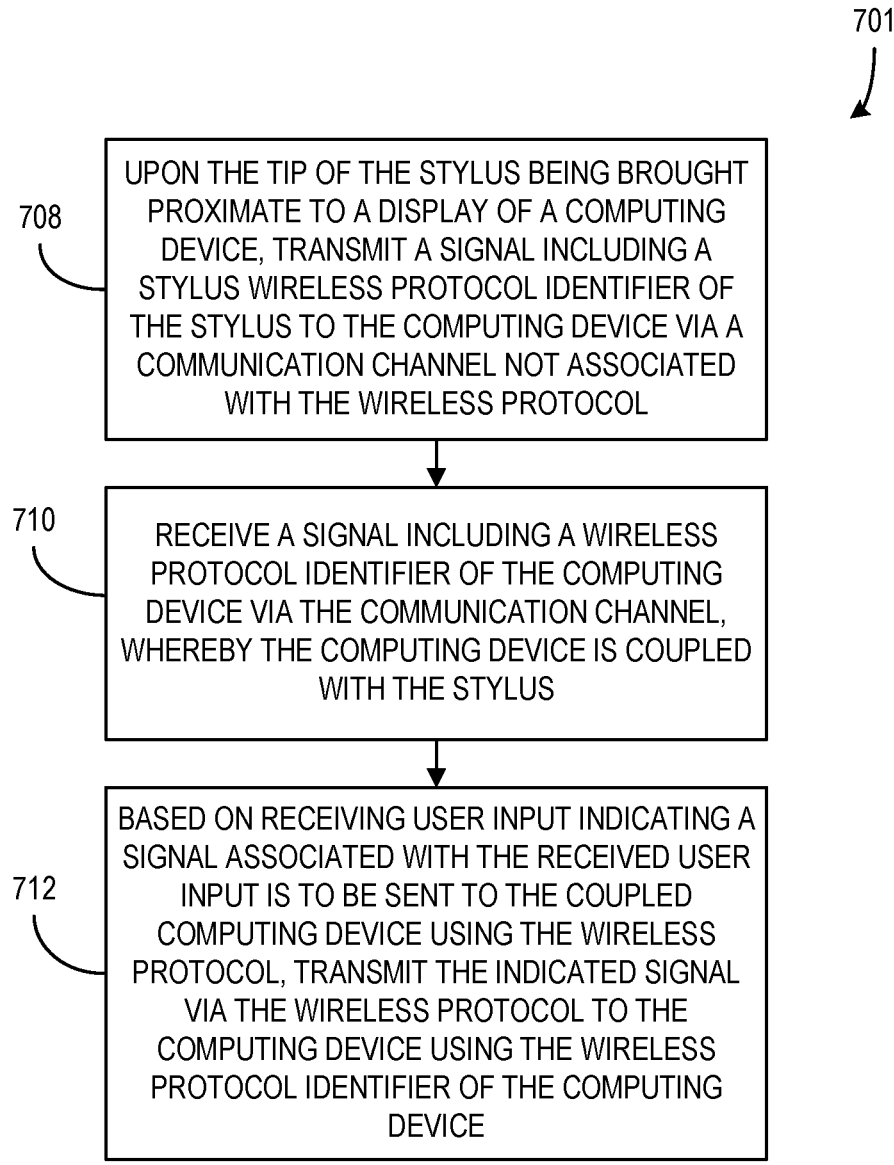

FIGS. 7A-B show flowcharts describing exemplary operations of a computing device and an associated stylus respectively according to an embodiment. In FIG. 7A, the flowchart 700 illustrates operations of a computing device according to an embodiment are described. At 702, the computing device receives a stylus wireless protocol identifier in a first signal from a stylus. The signal is communicated using a communication channel that is not associated with the wireless protocol with which the received stylus wireless protocol identifier is associated. For instance, the computing device may receive a BLE address of the stylus via an ES communication channel.

At 704, based on the receiving the stylus wireless protocol identifier, the computing device transmits a second signal including a wireless protocol identifier of the computing device and a security key to the stylus via the communication channel. The computing device and stylus may each store the wireless protocol identifiers of the respective devices and the security key, such that the computing device and stylus are loosely coupled as described herein. It should be understood that, while 704 describes sharing single a single security key, in some examples, multiple security keys may be shared.

At 706, based on receiving a third signal associated with user input from the coupled stylus via the wireless protocol, the computing device is configured to perform an operation based on the third signal. In some examples, the operation performed may include pairing the stylus and computing device (e.g., Bluetooth pairing, etc.). Other operations may include operations based on button presses or other sensor input events on the stylus. The third signal may be a directed advertising signal from the stylus that uses the wireless protocol identifier of the computing device to directly target the computing device with the third signal, enabling the user input from the stylus to cause the computing device to perform operations that would not be possible unless the computing device and stylus were paired or otherwise coupled as described herein.

In FIG. 7B, the flowchart 701 illustrates operations of a stylus according to an embodiment are described. At 708, upon the tip of the stylus being brought proximate to the display of the computing device, the stylus transmits a signal including a stylus wireless protocol identifier of the stylus to the computing device via the communication channel not associated with the wireless protocol as described above (e.g., ES communication channel, NFC channel, etc.).

At 710, the stylus receives a signal including a wireless protocol identifier of the computing device via the communication channel. The stylus may be configured to store the wireless protocol identifier of the computing device, such that the stylus and computing device are coupled as described herein.

At 712, based on receiving user input indicating a signal associated with the received user input is to be sent to the coupled computing device using the wireless protocol, the stylus transmits the indicated signal to via the wireless protocol to the computing device using the wireless protocol identifier of the computing device. As described above, the transmitted signal may cause the computing device to perform an associated operation.

The system, as described herein, may further be configured to perform any of the following operations, in any combination:

Storing a BLE address of the companion device in the digitizer of the companion device Receiving a pen identifier (BLE address or other identifier) from a pen device that is in proximity of and/or in contact with the digitizer or display of the companion device Sending the BLE address of the companion device stored in the digitizer to the pen device Mapping the pen identifier to a BLE address of the pen for use in the described operations Identifying a key (e.g., a signing key) when the companion device is unlocked (could be generating a new key, or reusing a key that already exists and/or is associated with the pen device)

Transmitting the identified key to the pen device, establishing "trust" with the pen device Receiving pen device input that causes a signal to be sent over BLE, including the key Listening, by the companion device, for the pen device due to the established coupling association Receiving, by the companion device, a signal that may be a "pen report"—an event that is signed using the key exchanged previously Using a "sign counter" with each message (may start at an agreed upon fixed number (e.g., a 32-bit random number, etc.))

Using a session key and validating a data signature for security

When signals no longer need to be transmitted (e.g., user stops using buttons on pen device, etc.), disconnecting the connection, while maintaining the coupled state across connections for a period of time Using NFC to exchange BLE addresses, a security key, and/or other identifiers Instead of BLE, using any other wireless channel and/or technology without departing from the description (e.g., Wi-Fi, etc.)

Switching a pen between companion devices based on the ink-based address exchange Associating a companion device with multiple pen devices at once "Forgetting" pens, by a companion device, after a defined period of time when it hasn't been communicated with for that period

ADDITIONAL EXAMPLES

Various example scenarios are next described.

Miles gets his new uplink-enabled companion device and uplink-enabled pen device. Miles docks his pen to the uplink-enabled companion device. Miles is now able to enjoy his pen's full functionality, both inking and BLE, and pressing the tail button invokes actions on his Uplink-enabled companion device.

Miles gets his new uplink-enabled companion device and uplink-enabled pen device. Miles docks his pen to the uplink-enabled companion device. Miles is now able to enjoy his pen's full functionality, both inking and BLE, and pressing the tail button invokes actions on his Uplink-enabled companion device.

Miles also owns another uplink-enabled device. After inking with his new pen on his uplink-enabled companion device, Miles now starts writing on his second device, causing a loosely coupled connection to be formed between the pen and the second device, and the new pen is now fully functional on his second device, without the need for pairing or performing any actions. Miles can go back and forth between his uplink enabled devices, and every time the new pen is loosely coupled to the device that Miles is writing with his new pen.

Megan starts using her new pen on her legacy device. She would like to use the Bluetooth features on her legacy device, so Megan presses the button for 5 seconds. She is prompted to go through the pairing flow. She clicks and double clicks and finds the same responsiveness to the clicks that she experienced with her legacy pen and devices. It works great while the system is in connected standby, when the system is locked (above the lock screen) and when she is logged in. Once Megan either dock and/or starts inking with the new pen on her new uplink-enabled companion device, the new pen is now associated to the uplink-enabled companion device. If Megan wishes to use the BT features on her legacy device again, she would have to press the tail button for 5 seconds to initiate pairing.

George is using the new Hub device in the team's meeting room. After inking with the new pen, he can use the tail button to use its Bluetooth functionality. Daryl has joined George, and both are collaborating and inking on the device. Now Daryl's pen is also capable of sending Bluetooth messages. Matt walks in with his personal uplink-enabled companion device and uplink-enabled pen device. Matt inks on his Uplink-enabled companion device and the Hub device interchangeably. Matt's pen inks on both devices, and the tail button acts on the last device he had inked on.

In another example, upon activation from a locked state, sleep state, or the like, the host device caches the host BLE address in the digitizer of the host device. Later, upon locking the host device, the host BLE address may be cleared from the digitizer. While the host device is active, the digitizer may receive a pen ID (e.g., a 32-bit ID) from a pen device when it is brought within a close proximity to the digitizer. In response, the digitizer may send the cached host BLE address to the pen device.

The host device may further receive a BLE address of the pen device from the pen device. The host device may map the received pen ID to the pen BLE address for later use. In order to facilitate secure communication, when unlocked, the host device may identify an authentication key (e.g., generate a new key or identify a key previously used with the pen device, etc.).

The authentication key is sent to the pen device after the pen device has received the host BLE address. The pen device and host device are loosely coupled.

Upon detecting a button press, the pen device initiates a BLE advertisement associated with the host device. The host device is already listening for the pen advertisement due to the loose coupling. The pen device sends a pen report that describes the pen event (e.g., the button press, etc.). The pen report is signed using the previously exchanged signing key and the key is sent with the pen report.

In some examples, a sign counter (e.g., a strictly increasing number with each message that is increased every time a new message is sent, etc.) is also used by the pen device and host device to prevent spoofing of pen reports. Both devices track the counter to predict the next valid number. This avoids replay attacks. Once the user stops using buttons of the pen, the connection between the host device and pen device may be disconnected. The loose coupling state may be maintained for a defined time period.

Exemplary Operating Environment

Figure 8:
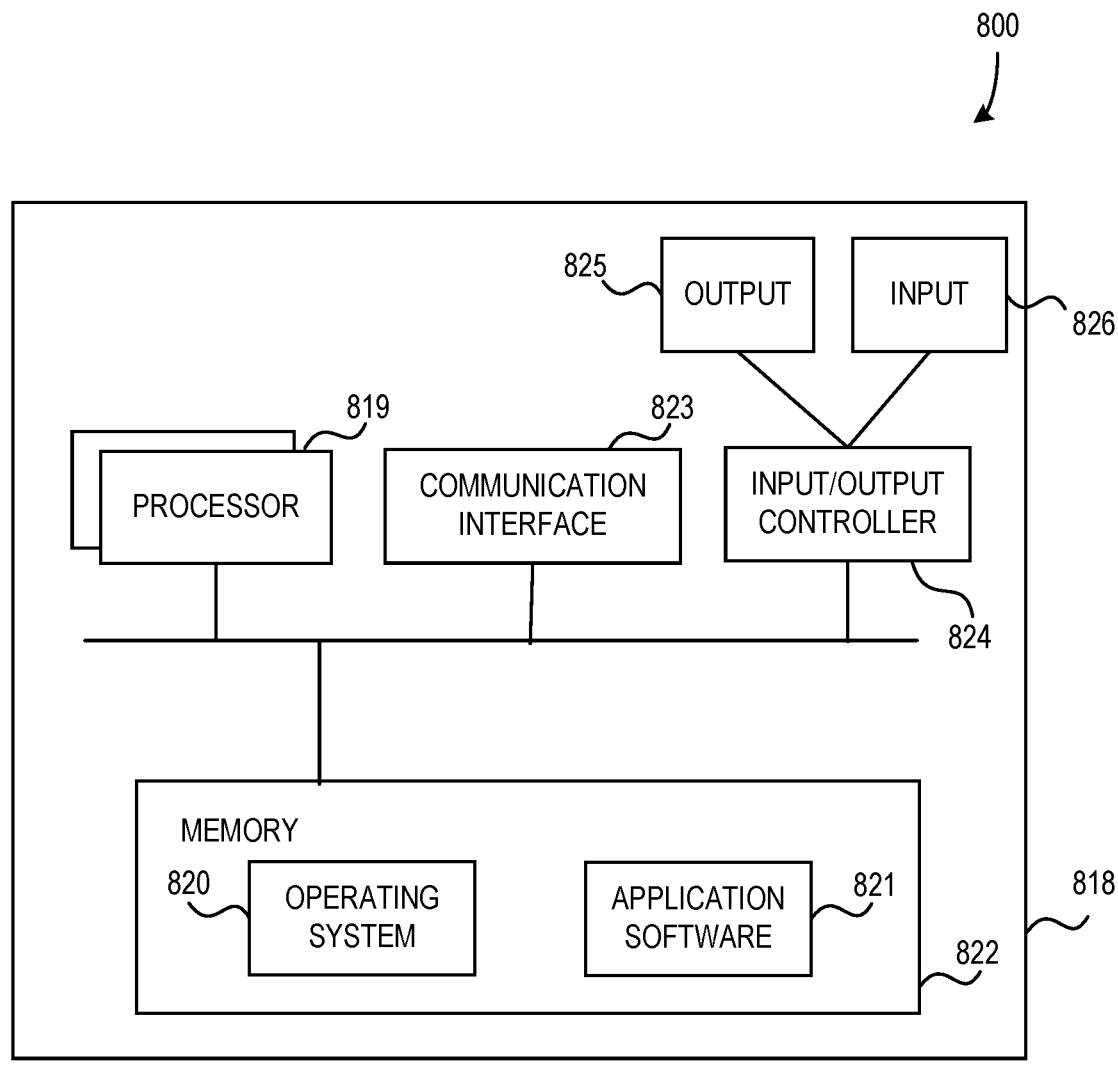
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), SOC systems, Complex Programmable Logic Devices (CPLDs), GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for coupling a stylus to a computing device, said system comprising:
a computing device having a display and configured to communicate with the stylus in accordance with a first wireless protocol and via at least one communication channel associated with a second wireless protocol, the computing device executing computer-executable instructions to:
receive a stylus wireless protocol identifier in a first signal from the stylus via the at least one communication channel;
based on receiving the stylus wireless protocol identifier, transmit a second signal including a wireless protocol identifier of the computing device and a signing key to the stylus via the at least one communication channel, whereby the computing device is coupled to the stylus; and
based on receiving a third signal from the coupled stylus via the first wireless protocol, perform an operation on the computing device based on the received third signal, the third signal indicating user input to the stylus.

A computerized method for coupling a stylus to a computing device, the computerized method comprising:
receiving, by the computing device, a stylus wireless protocol identifier from the stylus via at least one communication channel upon a tip of the stylus being brought proximate to a display of the computing device, the computing device configured to communicate with the stylus in accordance with a first wireless protocol, the at least one communication channel associated with a second wireless protocol;
based on receiving the stylus wireless protocol identifier, transmitting, by the computing device, a wireless protocol identifier of the computing device and a signing key to the stylus via the at least one communication channel, whereby the stylus and computing device are coupled; and
based on receiving a signal associated with user input from the coupled stylus via the wireless protocol, performing an operation on the computing device based on the received signal, the signal indicating user input to the stylus.

One or more computer storage media having computer-executable instructions for coupling a stylus to a computing device that, upon execution by at least one processor, causes the at least one processor to at least:
receive, by the computing device, a stylus wireless protocol identifier from the stylus via at least one communication channel upon a tip of the stylus being brought proximate to a display of the computing device, the computing device configured to communicate with the stylus in accordance with a first wireless protocol, the at least one communication channel associated with a second wireless protocol;
based on receiving the stylus wireless protocol identifier, transmitting, by the computing device, a wireless protocol identifier of the computing device and a signing key to the stylus via the at least one communication channel, whereby the stylus and computing device are coupled; and
based on receiving a signal associated with user input from the coupled stylus via the first wireless protocol, perform an operation on the computing device based on the received signal, the signal indicating user input to the stylus.
wherein performing, by the computing device, an operation based on the signal includes pairing the coupled stylus to the computing device based on the stylus wireless protocol identifier and the wireless protocol identifier of the computing device.
wherein the computing device is further configured to:
generate the signing key;
receive signature from the coupled stylus with the third signal from the coupled stylus; and
authenticate the third signal prior to performing the operation by comparing the received signature to an expected signature based on the signing key and validating the sign counter.
wherein the user input includes button event input to the stylus, and the third signal is a directed advertising signal to the computing device using the received wireless protocol identifier of the computing device, the directed advertising signal identifying a button event associated with the button event input, and wherein performing, by the computing device, an operation based on the third signal includes performing, by the computing device, an operation associated with the button event.
wherein performing, by the computing device, the operation based on the third signal includes:
establishing a connection associated with the first wireless protocol between the stylus and computing device;
generating a session key; and
sharing the generated session key with the stylus via the first wireless protocol, wherein the computing device is configured to exchange the shared session key during communications with the stylus using the established connection.

wherein the at least one communication channel includes one or more of the following: an ES communication channel and an NFC channel.

wherein the computing device is further configured to receive a second stylus wireless protocol identifier from a second stylus and transmit a signal including the wireless protocol identifier of the computing device to the second stylus, whereby the computing device is coupled to the second stylus concurrently with the first stylus.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for coupling a stylus to a computing device, the system comprising:
    a computing device having a display and configured to communicate with the stylus in accordance with a first wireless protocol and via at least one communication channel associated with a second wireless protocol, the computing device executing computer-executable instructions to:
    receive a stylus wireless protocol identifier in a first signal from the stylus via the at least one communication channel;
    based on receiving the stylus wireless protocol identifier, transmit a second signal including a wireless protocol identifier of the computing device and a signing key to the stylus via the at least one communication channel associated with the second wireless protocol, whereby the computing device is coupled to the stylus to listen for signals from the stylus; and
    based on receiving a third signal from the coupled stylus to the computing device via the first wireless protocol, perform an operation on the computing device based on the received third signal, the third signal indicating user input to the stylus;
    wherein performing, by the computing device, the operation based on the third signal includes pairing the coupled stylus to the computing device based on the stylus wireless protocol identifier and the wireless protocol identifier of the computing device.

2. The system of claim 1, wherein the computing device is further configured to:
    generate the signing key;
    receive a signature from the coupled stylus with the third signal from the coupled stylus; and
    authenticate the third signal prior to performing the operation by comparing the received signature to an expected signature based on the signing key and validating an associated sign counter.

3. The system of claim 1, wherein the user input to the stylus includes button event input associated with a button event, and wherein performing, by the computing device, an operation based on the third signal includes performing, by the computing device, an operation associated with the button event.

4. The system of claim 3, wherein performing, by the computing device, the operation based on the third signal includes:
    establishing a connection associated with the first wireless protocol between the stylus and computing device;
    generating a session key; and
    sharing the generated session key with the stylus via the first wireless protocol, wherein the computing device is configured to exchange the shared session key during communications with the stylus using the established connection.

5. The system of claim 1, wherein the at least one communication channel includes one or more of the following: an electrostatic (ES) communication channel and a near field communication (NFC) channel.

6. The system of claim 1, wherein the computing device is further configured to receive a second stylus wireless protocol identifier from a second stylus and transmit a signal including the wireless protocol identifier of the computing device to the second stylus, whereby the computing device is coupled to the second stylus concurrently with the first stylus.

7. The system of claim 1, wherein performing, by the computing device, an operation based on the third signal includes launching an application on the computing device prior to pairing the coupled stylus to the computing device.

8. A computerized method for coupling a stylus to a computing device, the computerized method comprising:
receiving, by the computing device, a stylus wireless protocol identifier from the stylus via at least one communication channel upon a tip of the stylus being brought proximate to a display of the computing device, the computing device configured to communicate with the stylus in accordance with a first wireless protocol, the at least one communication channel associated with a second wireless protocol;
based on receiving the stylus wireless protocol identifier, transmitting, by the computing device, a wireless protocol identifier of the computing device and a signing key to the stylus via the at least one communication channel, whereby the stylus and computing device are coupled; and
based on receiving a signal associated with user input from the coupled stylus via the first wireless protocol, performing an operation on the computing device based on the received signal, the signal indicating user input to the stylus.

9. The computerized method of claim 8, wherein performing, by the computing device, an operation based on the signal includes pairing the coupled stylus to the computing device based on the stylus wireless protocol identifier and the wireless protocol identifier of the computing device.

10. The computerized method of claim 8, further comprising:
generating the signing key;
receiving a signature from the coupled stylus with the signal associated with user input from the coupled stylus; and
authenticating said signal prior to performing the operation by comparing the received signature to an expected signature based on the signing key and validating the sign counter.

11. The computerized method of claim 8, wherein the user input includes button event input associated with a button event, and wherein performing, by the computing device, an operation based on the signal associated with user input includes performing, by the computing device, an operation associated with the button event.

12. The computerized method of claim 11, wherein performing, by the computing device, the operation based on the signal includes:
establishing a connection associated with the first wireless protocol between the stylus and computing device;
generating a session key; and
sharing the session key with the stylus via the first wireless protocol, wherein the computing device is configured to exchange the shared session key during communications with the stylus using the established connection.

13. The computerized method of claim 8, wherein the at least one communication channel includes one or more of the following: an electrostatic (ES) communication channel and a near field communication (NFC) channel.

14. The computerized method of claim 8, further comprising receiving a second stylus wireless protocol identifier from a second stylus, and transmitting the wireless protocol identifier of the computing device to the second stylus, whereby the computing device is coupled to the second stylus concurrently with the first stylus.

15. One or more computer storage media having computer-executable instructions for coupling a stylus to a computing device that, upon execution by at least one processor, causes the at least one processor to at least:
receive, by the computing device, a stylus wireless protocol identifier from the stylus via at least one communication channel upon a tip of the stylus being brought proximate to a display of the computing device, the computing device configured to communicate with the stylus in accordance with a first wireless protocol, the at least one communication channel associated with a second wireless protocol;
based on receiving the stylus wireless protocol identifier, transmitting, by the computing device, a wireless protocol identifier of the computing device and a signing key to the stylus via the at least one communication channel, whereby the stylus and computing device are coupled; and
based on receiving a signal associated with user input from the coupled stylus via the first wireless protocol, perform an operation on the computing device based on the received signal, the signal indicating user input to the stylus.

16. The one or more computer storage media of claim 15, wherein performing, by the computing device, an operation based on the signal includes pairing the coupled stylus to the computing device based on the stylus wireless protocol identifier and the wireless protocol identifier of the computing device.

17. The one or more computer storage media of claim 15, wherein the computer-executable instructions, upon execution by at least one processor, further cause the at least one processor to at least:
generate the signing key;
receive a signature from the coupled stylus with the signal associated with user input from the coupled stylus; and
authenticate said signal prior to performing the operation by comparing the received signature to an expected signature based on the signing key and validating the sign counter.

18. The one or more computer storage media of claim 15, wherein the user input includes button event input associated with a button event, and wherein performing, by the computing device, an operation based on the signal associated with user input includes performing, by the computing device, an operation associated with the button event.

19. The one or more computer storage media of claim 18, wherein performing, by the computing device, the operation based on the signal includes:
establishing a connection associated with the first wireless protocol between the stylus and computing device;
generating a session key; and
sharing the session key with the stylus via the first wireless protocol, wherein the computing device is configured to exchange the shared session key during communications with the stylus using the established connection.

20. The one or more computer storage media of claim 15, wherein the at least one communication channel includes one or more of the following: an electrostatic (ES) communication channel and a near field communication (NFC) channel.

* * * * *